(12) United States Patent
Hsu et al.

(10) Patent No.: US 6,559,240 B2
(45) Date of Patent: May 6, 2003

(54) PROCESS FOR TIN/SILICON COUPLING FUNCTIONALIZED RUBBERS

(75) Inventors: Wen-Liang Hsu, Cuyahoga Falls, OH (US); Adel Farhan Halasa, Bath, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/001,567

(22) Filed: Nov. 15, 2001

(65) Prior Publication Data

US 2002/0099148 A1 Jul. 25, 2002

Related U.S. Application Data

(60) Provisional application No. 60/252,782, filed on Nov. 22, 2000.

(51) Int. Cl.$^7$ .................................................. C08F 8/00
(52) U.S. Cl. ................................ 525/332.8; 525/332.9; 525/333.1; 525/333.2; 525/342; 526/178
(58) Field of Search ....................... 526/178; 525/332.8, 525/332.9, 333.1, 333.2, 342

(56) References Cited

U.S. PATENT DOCUMENTS

| | | | |
|---|---|---|---|
| 4,843,120 A | 6/1989 | Halasa et al. ................. | 525/23 |
| 5,047,483 A | 9/1991 | Halasa et al. ............... | 525/237 |
| 5,061,765 A | 10/1991 | Hsu et al. .................... | 526/141 |
| 5,096,973 A | 3/1992 | Herrmann et al. .......... | 525/314 |
| 5,137,998 A | 8/1992 | Hsu et al. ................... | 526/174 |
| 5,239,009 A | 8/1993 | Halasa et al. ............... | 525/258 |
| 5,272,220 A | 12/1993 | Rodgers et al. .......... | 525/332.3 |
| 5,376,745 A * | 12/1994 | Handlin et al. ............. | 526/178 |
| 5,405,927 A | 4/1995 | Hsu et al. .................... | 526/337 |
| 5,416,168 A * | 5/1995 | Willis et al. .............. | 525/333.2 |
| 5,486,574 A | 1/1996 | Himes et al. ................ | 525/314 |
| 5,612,435 A * | 3/1997 | Bening et al. ............. | 526/335 |
| 5,620,939 A | 4/1997 | Halasa et al. ............... | 502/154 |
| 5,627,237 A | 5/1997 | Halasa et al. ............... | 525/236 |
| 5,654,384 A | 8/1997 | Halasa et al. ............... | 526/174 |
| 5,665,829 A * | 9/1997 | Shepherd et al. ........ | 525/332.3 |
| 5,708,092 A * | 1/1998 | Schwindeman et al. .... | 525/272 |

OTHER PUBLICATIONS

U.S. patent application Ser. No. 09/461,653, Halasa et al., filed Dec. 14, 1999, Process for Improved Coupling of Rubbery Polymers.

* cited by examiner

Primary Examiner—Bernard Lipman
(74) Attorney, Agent, or Firm—Alvin T. Rockhill

(57) ABSTRACT

Rubbery polymers made by anionic polymerization can be coupled with both tin halides and silicon halides to improve the characteristics of the rubber for use in some applications, such as tire treads. In cases where the rubbery polymer is synthesized by anionic polymerization utilizing a polar modifier it is difficult to attain a high level of coupling. This invention is based upon the unexpected finding that the coupling efficiency of rubbery polymers made with polar modifiers can be significantly improved by initiating the anionic polymerization with an alkylsilyloxy protected functional lithium initiator having a structural formula selected from the group consisting of: (a):

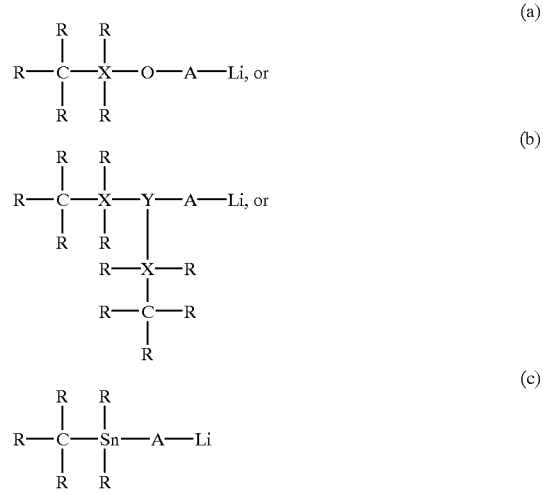

wherein X represents a group IVa element selected from the group consisting of carbon, silicon, germanium, and tin, wherein Y represents phosphorous or nitrogen, wherein R represents alkyl groups that can be the same or different, wherein the alkyl groups contain from 1 to about 8 carbon atoms, and wherein A represents an alkylene group containing from 1 to about 12 carbon atoms.

12 Claims, No Drawings

US 6,559,240 B2

PROCESS FOR TIN/SILICON COUPLING FUNCTIONALIZED RUBBERS

This application claims the benefit of provisional application Ser. No. 60/252,782, filed Nov. 22, 2000.

BACKGROUND OF THE INVENTION

It is highly desirable for tires to exhibit good traction characteristics on both dry and wet surfaces. However, it has traditionally been very difficult to improve the traction characteristics of a tire without compromising its rolling resistance and tread wear. Low rolling resistance is important because good fuel economy is virtually always an important consideration. Good tread wear is also an important consideration because it is generally the most important factor that determines the life of the tire.

The traction, tread wear, and rolling resistance of a tire is dependent to a large extent on the dynamic viscoelastic properties of the elastomers utilized in making the tire tread. In order to reduce the rolling resistance of a tire, rubbers having a high rebound have traditionally been utilized in making the tire's tread. On the other hand, in order to increase the wet skid resistance of a tire, rubbers that undergo a large energy loss have generally been utilized in the tire's tread. In order to balance these two viscoelastically inconsistent properties, mixtures of various types of synthetic and natural rubber are normally utilized in tire treads. For instance various mixtures of styrene-butadiene rubber and polybutadiene rubber are commonly used as a rubber material for automobile tire treads. However, such blends are not totally satisfactory for all purposes.

The inclusion of styrene-butadiene rubber (SBR) in tire tread formulations can significantly improve the traction characteristics of tires made therewith. However, styrene is a relatively expensive monomer and the inclusion of SBR is tire tread formulations leads to increased costs.

Carbon black is generally included in rubber compositions which are employed in making tires and most other rubber articles. It is desirable to attain the best possible dispersion of the carbon black throughout the rubber to attain optimized properties. It is also highly desirable to improve the interaction between the carbon black and the rubber. By improving the affinity of the rubber compound to the carbon black, physical properties can be improved. Silica can also be included in tire tread formulations to improve rolling resistance.

U.S. Pat. No. 4,843,120 discloses that tires having improved performance characteristics can be prepared by utilizing rubbery polymers having multiple glass transition temperatures as the tread rubber. These rubbery polymers having multiple glass transition temperatures exhibit a first glass transition temperature which is within the range of about −110° C. to −20° C. and exhibit a second glass transition temperature which is within the range of about −50° C. to 0° C. According to U.S. Pat. No. 4,843,120, these polymers are made by polymerizing at least one conjugated diolefin monomer in a first reaction zone at a temperature and under conditions sufficient to produce a first polymeric segment having a glass transition temperature which is between −110° C. and −20° C. and subsequently continuing said polymerization in a second reaction zone at a temperature and under conditions sufficient to produce a second polymeric segment having a glass transition temperature which is between −20° C. and 20° C. Such polymerizations are normally catalyzed with an organolithium catalyst and are normally carried out in an inert organic solvent.

U.S. Pat. No. 5,137,998 discloses a process for preparing a rubbery terpolymer of styrene, isoprene, and butadiene having multiple glass transition temperatures and having an excellent combination of properties for use in making tire treads which comprises: terpolymerizing styrene, isoprene and 1,3-butadiene in an organic solvent at a temperature of no more than about 40° C. in the presence of (a) at least one member selected from the group consisting of tripiperidino phosphine oxide and alkali metal alkoxides and (b) an organolithium compound.

U.S. Pat. No. 5,047,483 discloses a pneumatic tire having an outer circumferential tread where said tread is a sulfur cured rubber composition comprised of, based on 100 parts by weight rubber (phr), (A) about 10 to about 90 parts by weight of a styrene, isoprene, butadiene terpolymer rubber (SIBR), and (B) about 70 to about 30 weight percent of at least one of cis 1,4-polyisoprene rubber and cis 1,4-polybutadiene rubber wherein said SIBR rubber is comprised of (1) about 10 to about 35 weight percent bound styrene, (2) about 30 to about 50 weight percent bound isoprene and (3) about 30 to about 40 weight percent bound butadiene and is characterized by having a single glass transition temperature (Tg) which is in the range of about −10° C. to about −40° C. and, further the said bound butadiene structure contains about 30 to about 40 percent 1,2-vinyl units, the said bound isoprene structure contains about 10 to about 30 percent 3,4-units, and the sum of the percent 1,2-vinyl units of the bound butadiene and the percent 3,4-units of the bound isoprene is in the range of about 40 to about 70 percent.

U.S. Pat. No. 5,272,220 discloses a styrene-isoprene-butadiene rubber which is particularly valuable for use in making truck tire treads which exhibit improved rolling resistance and tread wear characteristics, said rubber being comprised of repeat units which are derived from about 5 weight percent to about 20 weight percent styrene, from about 7 weight percent to about 35 weight percent isoprene, and from about 55 weight percent to about 88 weight percent 1,3-butadiene, wherein the repeat units derived from styrene, isoprene and 1,3-butadiene are in essentially random order, wherein from about 25% to about 40% of the repeat units derived from the 1,3-butadiene are of the cis-microstructure, wherein from about 40% to about 60% of the repeat units derived from the 1,3-butadiene are of the trans-microstructure, wherein from about 5% to about 25% of the repeat units derived from the 1,3-butadiene are of the vinyl-microstructure, wherein from about 75% to about 90% of the repeat units derived from the isoprene are of the 1,4-microstructure, wherein from about 10% to about 25% of the repeat units derived from the isoprene are of the 3,4-microstructure, wherein the rubber has a glass transition temperature which is within the range of about −90° C. to about −70° C., wherein the rubber has a number average molecular weight which is within the range of about 150,000 to about 400,000, wherein the rubber has a weight average molecular weight of about 300,000 to about 800,000, and wherein the rubber has an inhomogeneity which is within the range of about 0.5 to about 1.5.

U.S. Pat. No. 5,239,009 reveals a process for preparing a rubbery polymer which comprises: (a) polymerizing a conjugated diene monomer with a lithium initiator in the substantial absence of polar modifiers at a temperature which is within the range of about 5° C. to about 100° C. to produce a living polydiene segment having a number average molecular weight which is within the range of about 25,000 to about 350,000; and (b) utilizing the living polydiene segment to initiate the terpolymerization of 1,3- butadiene, isoprene, and styrene, wherein the terpolymerization is conducted in the presence of at least one polar modifier at a temperature which is within the range of about 5° C. to about 70° C. to produce a final segment which is comprised of repeat units which are derived from 1,3-butadiene, isoprene, and styrene, wherein the final segment has a number average molecular weight which is within the range of about 25,000 to about 350,000. The rubbery polymer made by this process is reported to be useful for improving the wet skid resistance and traction characteristics of tires without sacrificing tread wear or rolling resistance.

U.S. Pat. No. 5,061,765 discloses isoprene-butadiene copolymers having high vinyl contents which can reportedly be employed in building tires which have improved traction, rolling resistance, and abrasion resistance. These high vinyl isoprene-butadiene rubbers are synthesized by copolymerizing 1,3-butadiene monomer and isoprene monomer in an organic solvent at a temperature which is within the range of about −10° C. to about 100° C. in the presence of a catalyst system which is comprised of (a) an organoiron compound, (b) an organoaluminum compound, (c) a chelating aromatic amine, and (d) a protonic compound; wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and herein the molar ratio of the protonic compound to the organoaluminum compound is within the range of about 0.001:1 to about 0.2:1.

U.S. Pat. No. 5,405,927 discloses an isoprene-butadiene rubber which is particularly valuable for use in making truck tire treads, said rubber being comprised of repeat units which are derived from about 20 weight percent to about 50 weight percent isoprene and from about 50 weight percent to about 80 weight percent 1,3-butadiene, wherein the repeat units derived from isoprene and 1,3-butadiene are in essentially random order, wherein from about 3% to about 10% of the repeat units in said rubber are 1,2-polybutadiene units, wherein from about 50% to about 70% of the repeat units in said rubber are 1,4-polybutadiene units, wherein from about 1% to about 4% of the repeat units in said rubber are 3,4-polyisoprene units, wherein from about 25% to about 40% of the repeat units in the polymer are 1,4-polyisoprene units, wherein the rubber has a glass transition temperature which is within the range of about −90° C. to about −75° C., and wherein the rubber has a Mooney viscosity which is within the range of about 55 to about 140.

U.S. Pat. No. 5,654,384 discloses a process for preparing high vinyl polybutadiene rubber which comprises polymerizing 1,3-butadiene monomer with a lithium initiator at a temperature which is within the range of about 5° C. to about 100° C. in the presence of a sodium alkoxide and a polar modifier, wherein the molar ratio of the sodium alkoxide to the polar modifier is within the range of about 0.1:1 to about 10:1; and wherein the molar ratio of the sodium alkoxide to the lithium initiator is within the range of about 0.05:1 to about 10:1. By utilizing a combination of sodium alkoxide and a conventional polar modifier, such as an amine or an ether, the rate of polymerization initiated with organolithium compounds can be greatly increased with the glass transition temperature of the polymer produced also being substantially increased. The rubbers synthesized using such catalyst systems also exhibit excellent traction properties when compounded into tire tread formulations. This is attributable to the unique macrostructure (random branching) of the rubbers made with such catalyst systems.

U.S. Pat. No. 5,620,939, U.S. Pat. No. 5,627,237, and U.S. Pat. 5,677,402 also disclose the use of sodium salts of saturated aliphatic alcohols as modifiers for lithium initiated solution polymerizations. Sodium t-amylate is a preferred sodium alkoxide by virtue of its exceptional solubility in non-polar aliphatic hydrocarbon solvents, such as hexane, which are employed as the medium for such solution polymerizations. However, using sodium t-amylate as the polymerization modifier in commercial operations where recycle is required can lead to certain problems. These problems arise due to the fact that sodium t-amylate reacts with water to form t-amyl alcohol during steam stripping in the polymer finishing step. Since t-amyl alcohol forms an azeotrope with hexane, it co-distills with hexane and thus contaminates the feed stream.

Tire rubbers which are prepared by anionic polymerization are frequently coupled with a suitable coupling agent, such as a tin halide, to improve desired properties. Tin-coupled polymers are known to improve treadwear and to reduce rolling resistance when used in tire tread rubbers. Such tin-coupled rubbery polymers are typically made by coupling the rubbery polymer with a tin coupling agent at or near the end of the polymerization used in synthesizing the rubbery polymer. In the coupling process, live polymer chain ends react with the tin coupling agent thereby coupling the polymer. For instance, up to four live chain ends can react with tin tetrahalides, such as tin tetrachloride, thereby coupling the polymer chains together.

The coupling efficiency of the tin coupling agent is dependant on many factors, such as the quantity of live chain ends available for coupling and the quantity and type of polar modifier, if any, employed in the polymerization. For instance, tin coupling agents are generally not as effective in the presence of polar modifiers. However, polar modifiers such as tetramethylethylenediamine, are frequently used to increase the glass transition temperature of the rubber for improved properties, such as improved traction characteristics in tire tread compounds. Coupling reactions that are carried out in the presence of polar modifiers typically have a coupling efficiency of about 50–60% in batch processes. Lower coupling efficiencies are typically attained in continuous processes.

U.S. Pat. No. application Ser. No. 09/461,653 discloses that coupling efficiency can be significantly improved by conducting the coupling reactions in the presence of a lithium salt of a saturated aliphatic alcohol, such as lithium t-amylate. In the alternative coupling efficiency can also be improved by conducting the coupling reaction in the presence of a lithium halide, or a lithium phenoxide. U.S. patent application Ser. No. 09/461,653 specifically discloses a process for coupling a living rubbery polymer that comprises reacting the living rubbery polymer with coupling agent selected from the group consisting of tin halides and silicon halides in the presence of a lithium salt of a saturated aliphatic alcohol. The lithium salt of the saturated aliphatic alcohol can be added immediately prior to the coupling reaction or it can be present throughout the polymerization and coupling process.

Each tin tetrahalide molecule or silicon tetrahalide molecule is capable of reacting with up to four live polymer chain ends. However, since perfect stoichiometry is difficult to attain, some of the tin halide molecules often react with less than four live polymer chain ends. The classical problem is that if more than a stoichiometric amount of the tin halide coupling agent is employed, then there will be an insufficient quantity of live polymer chain ends to totally react with the tin halide molecules on a four-to-one basis. On the other hand, if less than a stoichiometric amount of the tin halide coupling agent is added, then there will be an excess of live polymer chain ends and some of the live chain ends will not be coupled. It is accordingly important for the stoichiometry to be exact and for all to the living polymer chain-ends to react with the coupling agent.

Conventional tin coupling results in the formation of a coupled polymer that is essentially symmetrical. In other words, all of the polymer arms on the coupled polymer are of essentially the same chain length. All of the polymer arms in such conventional tin-coupled polymers are accordingly of essentially the same molecular weight. This results in such conventional tin-coupled polymers having a low polydispersity. For instance, conventional tin-coupled polymers normally having a ratio of weight average molecular weight to number average molecular weight which is within the range of about 1.01 to about 1.1

U.S. Pat. No. 5,486,574 discloses dissimilar arm asymmetric radical or star block copolymers for adhesives and sealants. U.S. Pat. No. 5,096,973 discloses ABC block copolymers based on butadiene, isoprene and styrene and further discloses the possibility of branching these block copolymers with tetrahalides of silicon, germanium, tin or lead.

SUMMARY OF THE INVENTION

The tin coupling efficiency (degree of coupling) attained with living polymers is normally reduced when polar modifiers, such as tetramethylethylenediamine (TMEDA) are present. However, polar modifiers are needed to increase the glass transition temperature of rubbery polymers to obtain desired properties, such as improved traction characteristics in tire tread compounds. Although a coupling efficiency within the range of 50 to 60 percent can be achieved in batch processes used in the synthesis of tin coupled styrene-butadiene rubbers, much lower levels of coupling are realized in continuous processes.

It has been unexpectedly found that the coupling efficiency of rubbery polymers made with polar modifiers can be significantly improved by initiating the anionic polymerization with certain alkylsilyloxy protected functional lithium initiators. In fact, coupling efficiencies of at least 70 percent are realized by utilizing the process of the present invention. In most, cases, coupling efficiencies of at least 80 percent are realized by utilizing the process of the present invention. The alkylsilyloxy protected functional lithium initiators utilized in the practice of this invention typically have a structural formula selected from the group consisting of (a)

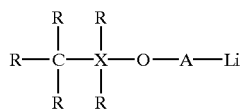

wherein X represents a group IVa element selected from the group consisting of carbon, silicon, germanium, and tin, wherein R represents alkyl groups that can be the same or different, wherein the alkyl groups contain from 1 to about 8 carbon atoms, and wherein A represents an alkylene group containing from 1 to about 12 carbon atoms; (b)

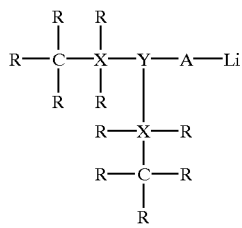

wherein X represents a group IVa element selected from the group consisting of carbon, silicon, germanium, and tin, wherein Y represents phosphorous or nitrogen, wherein R represents alkyl groups that can be the same or different, wherein the alkyl groups contain from 1 to about 8 carbon atoms, and wherein A represents an alkylene group containing from 1 to about 12 carbon atoms; and (c)

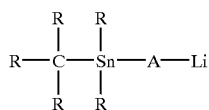

wherein R represents alkyl groups that can be the same or different, and wherein the alkyl groups contain from 1 to about 8 carbon atoms, and wherein A represents an alkylene group containing from 1 to about 12 carbon atoms.

The present invention more specifically discloses a process for synthesizing and coupling a rubbery polymer that comprises (1) polymerizing at least one conjugated diolefin monomer in the presence of a polar modifier to produce a living rubbery polymer, wherein said polymerization is an anionic polymerization that is initiated with an alkylsilyloxy protected functional lithium initiator having a the structural formula selected from the group consisting of (a)

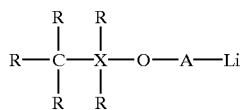

wherein X represents a group IVa element selected from the group consisting of carbon, silicon, germanium, and tin, wherein R represents alkyl groups that can be the same or different, wherein the alkyl groups contain from 1 to about 8 carbon atoms, and wherein A represents an alkylene group containing from 1 to about 12 carbon atoms; (b)

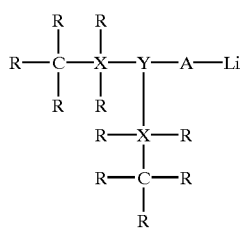

wherein X represents a group IVa element selected from the group consisting of carbon, silicon, germanium, and tin, wherein Y represents phosphorous or nitrogen, wherein R represents alkyl groups that can be the same or different, wherein the alkyl groups contain from 1 to about 8 carbon atoms, and wherein A represents an alkylene group containing from 1 to about 12 carbon atoms; and (c)

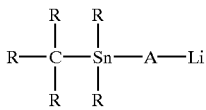

wherein R represents alkyl groups that can be the same or different, and wherein the alkyl groups contain from 1 to about 8 carbon atoms, and wherein A represents an alkylene group containing from 1 to about 12 carbon atoms; and (2) reacting the living rubbery polymer with a coupling agent selected from the group consisting of tin halides and silicon halides.

The present invention further discloses a process process for synthesizing a rubbery polymer that comprises polymerizing at least one conjugated diolefin monomer in the presence of a polar modifier to produce a living rubbery polymer, wherein said polymerization is an anionic polymerization that is initiated with an alkylsilyloxy protected functional lithium initiator having a the structural formula selected from the group consisting of (a)

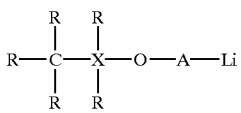

wherein X represents a group IVa element selected from the group consisting of carbon, silicon, germanium, and tin, wherein R represents alkyl groups that can be the same or different, wherein the alkyl groups contain from 1 to about 8 carbon atoms, and wherein A represents an alkylene group that contains from 1 to about 12 carbon atoms; (b)

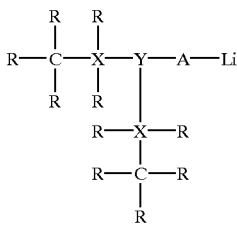

wherein X represents a group IVa element selected from the group consisting of carbon, silicon, germanium, and tin, wherein Y represents phosphorous or nitrogen, wherein R represents alkyl groups that can be the same or different, wherein the alkyl groups contain from 1 to about 8 carbon atoms, and wherein A represents an alkylene group that contains from 1 to about 12 carbon atoms; and (c):

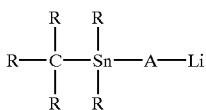

wherein R represents alkyl groups that can be the same or different, and wherein the alkyl groups contain from 1 to about 8 carbon atoms, and wherein A represents an alkylene group that contains from 1 to about 12 carbon atoms.

The present invention also reveals a tire which is comprised of a generally toroidal-shaped carcass with an outer circumferential tread, two spaced beads, at least one ply extending from bead to bead and sidewalls extending radially from and connecting said tread to said beads; wherein said tread is adapted to be ground-contacting; and wherein said tread is comprised of the carbon black, silica, and a coupled rubbery polymer made by a process that comprises (1) polymerizing at least one conjugated diolefin monomer in the presence of a polar modifier to produce a living rubbery polymer, wherein said polymerization is an anionic polymerization that is initiated with an alkylsilyloxy protected functional lithium initiator having a the structural formula selected from the group consisting of (a)

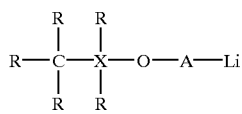

wherein X represents a group IVa element selected from the group consisting of carbon, silicon, germanium, and tin, wherein R represents alkyl groups that can be the same or different, wherein the alkyl groups contain from 1 to about 8 carbon atoms, and wherein A represents an alkylene group containing from 1 to about 12 carbon atoms; (b)

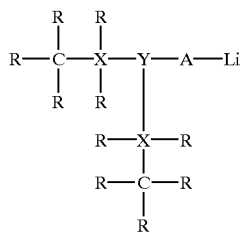

wherein X represents a group IVa element selected from the group consisting of carbon, silicon, germanium, and tin, wherein Y represents phosphorous or nitrogen, wherein R represents alkyl groups that can be the same or different, wherein the alkyl groups contain from 1 to about 8 carbon atoms, and wherein A represents an alkylene group containing from 1 to about 12 carbon atoms; and (c)

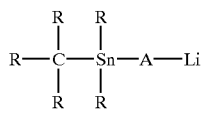

wherein R represents alkyl groups that can be the same or different, and wherein the alkyl groups contain from 1 to about 8 carbon atoms, and wherein A represents an alkylene group containing from 1 to about 12 carbon atoms; and (2) reacting the living rubbery polymer with a coupling agent selected from the group consisting of tin halides and silicon halides.

The subject invention also reveals an initiator which is particularly useful for initiating the anionic polymerization of conjugated diolefin monomers into rubbery polymers said initiator having a structural formula selected from the group consisting of (a)

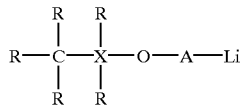

wherein X represents a group IVa element selected from the group consisting of carbon, germanium, and tin, wherein R represents alkyl groups that can be the same or different, wherein the alkyl groups contain from 1 to about 8 carbon atoms, and wherein A represents an alkylene group that contains from 1 to about 12 carbon atoms; (b)

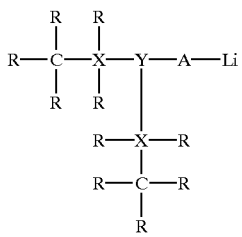

wherein X represents a group IVa element selected from the group consisting of carbon, germanium, and tin, wherein Y represents phosphorous or nitrogen, wherein R represents alkyl groups that can be the same or different, wherein the alkyl groups contain from 1 to about 8 carbon atoms, and wherein A represents an alkylene group that contains from 1 to about 12 carbon atoms; and (c):

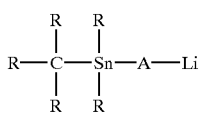

wherein R represents alkyl groups that can be the same or different, and wherein the alkyl groups contain from 1 to about 8 carbon atoms, and wherein A represents an alkylene group that contains from 1 to about 12 carbon atoms.

DETAILED DESCRIPTION OF THE INVENTION

Virtually any type of rubbery polymer prepared by anionic polymerization can be synthesized and coupled in accordance with this invention. The rubbery polymers that can be coupled will typically be synthesized by a solution polymerization technique that utilizes as the initiator an alkylsilyloxy protected functional lithium initiator of the structural formula: (a)

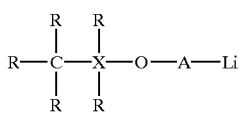

wherein X represents a group IVa element selected from the group consisting of carbon, germanium, and tin, wherein R represents alkyl groups that can be the same or different, wherein the alkyl groups contain from 1 to about 8 carbon atoms, and wherein A represents an alkylene group that contains from 1 to about 12 carbon atoms; or (b)

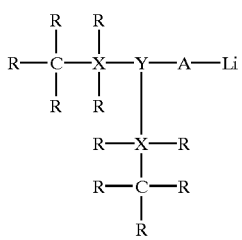

wherein X represents a group IVa element selected from the group consisting of carbon, germanium, and tin, wherein Y represents phosphorous or nitrogen, wherein R represents alkyl groups that can be the same or different, wherein the alkyl groups contain from 1 to about 8 carbon atoms, and wherein A represents an alkylene group that contains from 1 to about 12 carbon atoms; or (c)

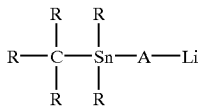

wherein R represents alkyl groups that can be the same or different, and wherein the alkyl groups contain from 1 to about 8 carbon atoms, and wherein A represents an alkylene group that contains from 1 to 12 carbon atoms. The alkylene group can be straight chained or branched. For instance, A can represent a straight chained alkylene group of the structural formula —$(CH_2)_n$— or it can represent a branched alkylene group, such as:

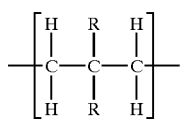

wherein R represents alkyl groups that can be the same or different, and wherein the alkyl groups contain from 1 to about 8 carbon atoms. R will typically represent an alkyl group containing from 1 to about 4 carbon atoms. It is preferred for R to represent methyl groups.

The alkylsilyloxy protected functional lithium initiator can be of the structural formula:

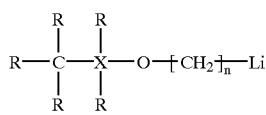

wherein X represents a group IVa element selected from the group consisting of carbon, silicon, germanium, and tin, wherein n represents an integer from 1 to 10, wherein R represents alkyl groups that can be the same or different, and wherein the alkyl groups contain from 1 to about 8 carbon atoms, or an alkylsilyloxy protected functional lithium compound of the structural formula:

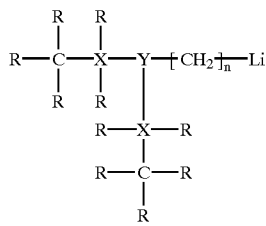

wherein X represents a group IVa element selected from the group consisting of carbon, silicon, germanium, and tin, wherein Y represents phosphorous or nitrogen, wherein n represents an integer from 1 to 10, wherein R represents alkyl groups that can be the same or different, and wherein the alkyl groups contain from 1 to about 8 carbon atoms. These rubbery polymers will accordingly normally contain a "living" lithium chain end.

The alkylsilyloxy protected functional lithium initiator can be of the structural formula:

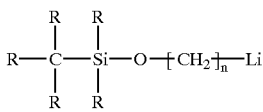

wherein n represents an integer from 1 to 10, wherein R represents alkyl groups that can be the same or different, and wherein the alkyl groups contain from 1 to about 8 carbon atoms. It is normally preferred for n to represent an integer from 1 to about 6. It is more preferred from n to represent an integer from 2 to 4. It is typically most preferred from n to represent 3. In most cases, R will represent alkyl groups containing from 1 to about 4 carbon atoms. R will preferable represent methyl groups, ethyl groups, normal-propyl groups, or isopropyl groups. It is typically most preferred for R to represent methyl groups. A highly preferred initiator is 3-(t-butyldimethylsilyloxy)-1-propyllithium which is commercially available from FMC Corporation.

The polymerizations employed in synthesizing the living rubbery polymers will normally be carried out in a hydrocarbon solvent. Such hydrocarbon solvents are comprised of one or more aromatic, paraffinic or cycloparaffinic compounds. These solvents will normally contain from about 4 to about 10 carbon atoms per molecule and will be liquid under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, petroleum naphtha, and the like, alone or in admixture.

In the solution polymerization, there will normally be from 5 to 30 weight percent monomers in the polymerization medium. Such polymerization media are, of course, comprised of the organic solvent and monomers. In most cases, it will be preferred for the polymerization medium to contain from 10 to 25 weight percent monomers. It is generally more preferred for the polymerization medium to contain 15 to 20 weight percent monomers.

The polymerizations employed in making the rubbery polymer are typically initiated by adding the alkylsiloxy protected functional initiator to an organic polymerization medium that contains the monomers. Such polymerizations are typically carried out utilizing continuous polymerization techniques. In such continuous polymerizations, monomers and initiator are continuously added to the organic polymerization medium with the rubbery polymer synthesized being continuously withdrawn. Such continuous polymerizations are typically conducted in a multiple reactor system.

The rubbery polymers that are coupled in accordance with this invention can be made by the homopolymerization of a conjugated diolefin monomer or by the random copolymerization of a conjugated diolefin monomer with a vinyl aromatic monomer. It is, of course, also possible to make living rubbery polymers that can be coupled by polymerizing a mixture of conjugated diolefin monomers with one or more ethylenically unsaturated monomers, such as vinyl aromatic monomers. The conjugated diolefin monomers which can be utilized in the synthesis of rubbery polymers which can be coupled in accordance with this invention generally contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in admixture.

Some representative examples of ethylenically unsaturated monomers that can potentially be synthesized into rubbery polymers which can be coupled in accordance with this invention include alkyl acrylates, such as methyl acrylate, ethyl acrylate, butyl acrylate, methyl methacrylate and the like; vinylidene monomers having one or more terminal $CH_2=CH-$ groups; vinyl aromatics such as styrene, α-methylstyrene, bromostyrene, chlorostyrene, fluorostyrene and the like; α-olefins such as ethylene, propylene, 1-butene and the like; vinyl halides, such as vinylbromide, chloroethane (vinylchloride), vinylfluoride, vinyliodide, 1,2-dibromoethene, 1,1-dichloroethene (vinylidene chloride), 1,2-dichloroethene and the like; vinyl esters, such as vinyl acetate; α,β-olefinically unsaturated nitriles, such as acrylonitrile and methacrylonitrile; α,β-olefinically unsaturated amides, such as acrylamide, N-methyl acrylamide, N,N-dimethylacrylamide, methacrylamide and the like.

Rubbery polymers which are copolymers of one or more diene monomers with one or more other ethylenically unsaturated monomers will normally contain from about 50 weight percent to about 99 weight percent conjugated diolefin monomers and from about 1 weight percent to about 50 weight percent of the other ethylenically unsaturated monomers in addition to the conjugated diolefin monomers. For example, copolymers of conjugated diolefin monomers with vinylaromatic monomers, such as styrene-butadiene rubbers which contain from 50 to 95 weight percent conjugated diolefin monomers and from 5 to 50 weight percent vinylaromatic monomers, are useful in many applications.

Vinyl aromatic monomers are probably the most important group of ethylenically unsaturated monomers which are commonly incorporated into polydienes. Such vinyl aromatic monomers are, of course, selected so as to be copolymerizable with the conjugated diolefin monomers being utilized. Generally, any vinyl aromatic monomer which is known to polymerize with organolithium initiators can be used. Such vinyl aromatic monomers typically contain from 8 to 20 carbon atoms. Usually, the vinyl aromatic monomer will contain from 8 to 14 carbon atoms. The most widely used vinyl aromatic monomer is styrene. Some examples of vinyl aromatic monomers that can be utilized include styrene, 1-vinylnaphthalene, 2-vinylnaphthalene, α-methylstyrene, 4-phenylstyrene, 3-methylstyrene and the like.

Some representative examples of rubbery polymers which can be coupled in accordance with this invention include polybutadiene, polyisoprene, styrene-butadiene rubber (SBR), α-methylstyrene-butadiene rubber, α-methylstyrene-isoprene rubber, styrene-isoprene-butadiene rubber (SIBR), styrene-isoprene rubber (SIR), isoprene-butadiene rubber (IBR), α-methylstyrene-isoprene-butadiene rubber and α-methylstyrene-styrene-isoprene-butadiene rubber. In cases where the rubbery polymer is comprised of repeat units that are derived from two or more monomers, the repeat units which are derived from the different monomers will normally be distributed in an essentially random manner.

The amount of organolithium initiator utilized will vary with the monomers being polymerized and with the molecular weight that is desired for the polymer being synthesized. However, as a general rule, from 0.01 to 1 phm (parts per 100 parts by weight of monomer) of an organolithium initiator will be utilized. In most cases, from 0.01 to 0.1 phm of an organolithium initiator will be utilized with it being preferred to utilize 0.025 to 0.07 phm of the organolithium initiator.

The polymerization temperature utilized can vary over a broad range of from about −20° C. to about 180° C. In most cases, a polymerization temperature within the range of about 30° C. to about 125° C. will be utilized. It is typically preferred for the polymerization temperature to be within the range of about 45° C. to about 100° C. It is typically most preferred for the polymerization temperature to be within the range of about 60° C. to about 85° C. The pressure used will normally be sufficient to maintain a substantially liquid phase under the conditions of the polymerization reaction.

The polymerization is conducted for a length of time sufficient to permit substantially complete polymerization of monomers. In other words, the polymerization is normally carried out until high conversions are attained. The polymerization is then terminated by the addition of a tin halide and/or silicon halide. The tin halide and/or the silicon halide are continuous added in cases where asymmetrical coupling is desired. This continuous addition of tin coupling agent and/or the silicon coupling agent is normally done in a reaction zone separate from the zone where the bulk of the polymerization is occurring. In other words, the coupling will typically be added only after a high degree of conversion has already been attained. For instance, the coupling agent will normally be added only after a monomer conversion of greater than about 90 percent has been realized. It will typically be preferred for the monomer conversion to reach at least about 95 percent before the coupling agent is added. As a general rule, it is most preferred for the monomer conversion to exceed about 98 percent before the coupling agent is added. The coupling agents will normally be added in a separate reaction vessel after the desired degree of conversion has been attained. The coupling agents can be added in a hydrocarbon solution, e.g., in cyclohexane, to the polymerization admixture with suitable mixing for distribution and reaction.

In cases where the rubbery polymer will be used in compounds that are loaded primarily with carbon black, the coupling agent will typically be a tin halide. The tin halide will normally be a tin tetrahalide, such as tin tetrachloride, tin tetrabromide, tin tetrafluoride or tin tetraiodide. However, tin trihalides can also optionally be used. Polymers coupled with tin trihalides having a maximum of three arms. This is, of course, in contrast to polymers coupled with tin tetrahalides which have a maximum of four arms. To induce a higher level of branching, tin tetrahalides are normally preferred. As a general rule, tin tetrachloride is most preferred.

In cases where the rubbery polymer will be used in compounds that are loaded with high levels of silica, the coupling agent will typically be a silicon halide. The silicon coupling agents that can be used will normally be silicon tetrahalides, such as silicon tetrachloride, silicon tetrabromide, silicon tetrafluoride or silicon tetraiodide. However, silicon trihalides can also optionally be used. Polymers coupled with silicon trihalides having a maximum of three arms. This is, of course, in contrast to polymers coupled with silicon tetrahalides which have a maximum of four arms. To induce a higher level of branching, silicon tetrahalides are normally preferred. As a general rule, silicon tetrachloride is most preferred of the silicon coupling agents.

Greatly improved properties for tire rubbers, such as lower hysteresis, can be attained by coupling the rubber with both a tin halide and a silicon halide. For instance, such coupled polymers can be utilized in making tires having greatly improved rolling resistance without sacrificing other tire properties. These improved properties are due in part to better interaction and compatibility with carbon black. It is highly preferred for the polymer to be asymmetrically coupled with a tin halide and a silicon halide. Asymmetrical tin coupling also normally leads to improve the cold flow characteristics. Asymmetrical coupling in general also leads to better processability and other beneficial properties. Rubbers that are coupled with both a tin halide and a silicon halide are comprised of (1) tin atoms having at least three polydiene arms covalently bonded thereto and (2) silicon atoms having at least three polydiene arms covalently bonded thereto This invention more specifically discloses a coupled rubbery polymer which is particularly valuable for use in manufacturing tire tread compounds, said coupled rubbery polymer being comprised of (1) tin atoms having at least three polydiene arms covalently bonded thereto and (2) silicon atoms having at least three polydiene arms covalently bonded thereto.

The tin coupling agent will normally be a tin tetrahalide, such as tin tetrachloride, tin tetrabromide, tin tetrafluoride or tin tetraiodide. However, tin trihalides can also optionally be used. Polymers coupled with tin trihalides having a maximum of three arms. This is, of course, in contrast to polymers coupled with tin tetrahalides which have a maximum of four arms. To induce a higher level of branching, tin tetrahalides are normally preferred. As a general rule, tin tetrachloride is most preferred.

The silicon coupling agent will normally be a silicon tetrahalide, such as silicon tetrachloride, silicon tetrabromide, silicon tetrafluoride or silicon tetraiodide. However, silicon trihalides can also optionally be used. Polymers coupled with silicon trihalides having a maximum of three arms. This is, of course, in contrast to polymers coupled with silicon tetrahalides which have a maximum of four arms. To induce a higher level of branching, silicon tetrahalides are normally preferred. As a general rule, silicon tetrachloride is most preferred.

The molar ratio of the tin halide to the silicon halide employed in coupling the rubbery polymer will normally be within the range of 20:80 to 95:5. The molar ratio of the tin halide to the silicon halide employed in coupling the rubbery polymer will more typically be within the range of 40:60 to 90:10. The molar ratio of the tin halide to the silicon halide employed in coupling the rubbery polymer will preferably be within the range of 60:40 to 85:15. The molar ratio of the tin halide to the silicon halide employed in coupling the rubbery polymer will most preferably be within the range of 65:35 to 80:20.

Asymmetrically rubbery polymers that are coupled with both tin and silicon contain stars of the structural formula:

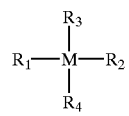

wherein M represents silicon or tin, wherein $R_1$, $R_2$, $R_3$ and $R_4$ can be the same or different and are selected from the group consisting of alkyl groups and polydiene arms (polydiene rubber chains), with the proviso that at least three members selected from the group consisting of $R_1$, $R_2$, $R_3$ and $R_4$ are polydiene arms, with the proviso that at least one member selected from the group consisting of $R_1$, $R_2$, $R_3$ and $R_4$ is a low molecular weight polydiene arm, with the proviso that at least one member selected from the group consisting of $R_1$, $R_2$, $R_3$ and $R_4$ is a high molecular weight polydiene arm, and with the proviso that the ratio of the weight average molecular weight to the number average molecular weight of the asymmetrical tin-coupled rubbery polymer is within the range of about 1.4 to about 2.5

In other words, asymmetrical rubbery polymers that are coupled with both tin and silicon contain stars of the structural formulas:

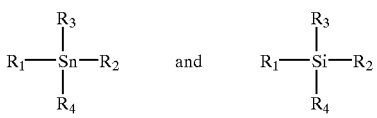

wherein $R^1$, $R^2$, $R^3$ and $R^4$ can be the same or different and are selected from the group consisting of alkyl groups and polydiene arms (polydiene rubber chains), with the proviso that at least three members selected from the group consisting of $R^1$, $R^2$, $R^3$ and $R^4$ are polydiene arms. In most cases, four polydiene arms will be covalently bonded to the tin atoms and the silicon atoms in the asymmetrical tin-coupled rubbery polymer. In such cases, $R^1$, $R^2$, $R^3$ and $R^4$ will all be polydiene arms. It should be noted that $R^1$, $R^2$, $R^3$ and $R^4$ can be alkyl groups because it is possible for the tin halide coupling agent to react directly with alkyl lithium compounds which are used as the polymerization initiator.

The polydiene arms in the asymmetrical tin-coupled rubbery polymers of this invention will typically have a weight average molecular weight that is within the range of about 80,000 to about 300,000. The polydiene arms will more typically have a weight average molecular weight that is within the range of about 120,000 to about 250,000. The ratio of the weight average molecular weight to the number average molecular weight of the asymmetrical tin-coupled rubbery polymer is typically within the range of about 1.4 to about 2.5. The ratio of the weight average molecular weight to the number average molecular weight of the asymmetrical tin-coupled rubbery polymer is typically within the range of about 1.4 to about 2.0. The ratio of the weight average molecular weight to the number average molecular weight of the asymmetrical tin-coupled rubbery polymer is more typically within the range of about 1.45 to about 1.8. The ratio of the weight average molecular weight to the number average molecular weight of the asymmetrical coupled rubbery polymer is most typically within the range of about 1.5 to about 2.7. Normally at least one of the polydiene arms covalently bonded to the tin has a weight average molecular weight of less than about 150,000 and at least one of the polydiene arms covalently bonded to the tin atom has a weight average molecular weight of greater than about 200,000.

The polydiene arms in the asymmetrical tin-coupled rubbery polymers of this invention are not block copolymers. In cases where vinyl aromatic monomers, such as styrene, are present in the polydiene arms they are not present in blocks containing more than about 4 repeat units. In other words, the vinyl aromatic monomers will be distributed in a random fashion throughout the polydiene arms.

Optionally, silicon trialkyl halide or a tin trialkyl halide, such as tin tributyl chloride, can be used to functionalize all or a protion of the rubbery polymer. For instance, the living rubbery polymer can be coupled and functionalized by utilizing a combination of silicon tetrachloride and tin tributylchloride.

Broadly, and exemplary, a range of about 0.01 to 4.5 milliequivalents of tin coupling agent (tin halide and silicon halide) is employed per 100 grams of the rubbery polymer. It is normally preferred to utilize about 0.01 to about 1.5 milliequivalents of the coupling agent per 100 grams of polymer to obtain the desired Mooney viscosity. The larger quantities tend to result in production of polymers containing terminally reactive groups or insufficient coupling. One equivalent of tin coupling agent per equivalent of lithium is considered an optimum amount for maximum branching. For instance, if a mixture tin tetrahalide and silicon tetrahalide is used as the coupling agent, one mole of the coupling agent would be utilized per four moles of live lithium ends. In cases where a mixture of tin trihalide and silicon trihalide is used as the coupling agent, one mole of the coupling agent will optimally be utilized for every three moles of live lithium ends. The coupling agent can be added in a hydrocarbon solution, e.g., in cyclohexane, to the polymerization admixture in the reactor with suitable mixing for distribution and reaction.

After the coupling has been completed, a tertiary chelating alkyl 1,2-ethylene diamine or a metal salt of a cyclic alcohol can optionally be added to the polymer cement to stabilize the coupled rubbery polymer. The tertiary chelating amines that can be used are normally chelating alkyl diamines of the structural formula:

wherein n represents an integer from 1 to about 6, wherein A represents an alkylene group containing from 1 to about 6 carbon atoms and wherein R', R", R'" and R"" can be the same or different and represent alkyl groups containing from 1 to about 6 carbon atoms. The alkylene group A is of the formula $-(-CH_2-)_m$ wherein m is an integer from 1 to about 6. The alkylene group will typically contain from 1 to 4 carbon atoms (m will be 1 to 4) and will preferably contain 2 carbon atoms. In most cases, n will be an integer from 1 to about 3 with it being preferred for n to be 1. It is preferred for R', R", R'" and R"" to represent alkyl groups which contain from 1 to 3 carbon atoms. In most cases, R', R'", R'" and R"" will represent methyl groups.

In most cases, from about 0.01 phr (parts by weight per 100 parts by weight of dry rubber) to about 2 phr of the chelating alkyl 1,2-ethylene diamine or metal salt of the cyclic alcohol will be added to the polymer cement to stabilize the rubbery polymer. Typically, from about 0.05 phr to about 1 phr of the chelating alkyl 1,2-ethylene diamine or metal salt of the cyclic alcohol will be added. More typically, from about 0.1 phr to about 0.6 phr of the chelating alkyl 1,2-ethylene diamine or the metal salt of the cyclic alcohol will be added to the polymer cement to stabilize the rubbery polymer.

After the polymerization, coupling, and optionally the stabilization step, has been completed, the coupled rubbery polymer can be recovered from the organic solvent. The coupled rubbery polymer can be recovered from the organic solvent and residue by means such as decantation, filtration, centrifugation and the like. It is often desirable to precipitate the coupled rubbery polymer from the organic solvent by the addition of lower alcohols containing from about 1 to about 4 carbon atoms to the polymer solution. Suitable lower alcohols for precipitation of the rubber from the polymer cement include methanol, ethanol, isopropyl alcohol, normal-propyl alcohol and t-butyl alcohol. The utilization of lower alcohols to precipitate the asymmetrically tin-coupled rubbery polymer from the polymer cement also "kills" any remaining living polymer by inactivating lithium end groups. After the coupled rubbery polymer is recovered from the solution, steam-stripping can be employed to reduce the level of volatile organic compounds in the coupled rubbery polymer.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLE 1

In this experiment, a tin coupled styrene-butadiene rubber was prepared at 70° C. In the procedure used, 2300 g of a silica/alumina/molecular sieve dried premix containing 19.5 weight percent styrene/1,3-butadiene mixture in hexanes was charged into a one-gallon (3.8 liters) reactor. The ratio of styrene to 1,3-butadiene was 15:85. After the amount of impurity in the premix was determined, 2.4 ml of 1M solution of TMEDA (N,N,N',N'-tetramethylethylene-diamine in hexanes), and 4.3 ml. of 0.7M solution of 3-(t-butyldimethylsilyloxy)-1-propyllithium (in cyclohexane) were added to the reactor. The target Mn (number averaged molecular weight) was 150,000. The polymerization was allowed to proceed at 70° C. for 1.5 hours. The GC analysis of the residual monomers contained in the polymerization mixture indicated that most of the monomers were converted to polymer. After a small aliquot of polymer cement was removed from the reactor (for analysis), 1.2 ml. of a 0.6M solution of tin tetrachloride (in hexanes) was added to the reactor and the coupling reaction was carried out the same temperature for an hour. At this time, 1.0 phr (parts per 100 parts of rubber by weight) of BHT (2,6-di-tert-butyl-4-methylphenol) and 3.0 ml of 1M solution of TMEDA were added to the reactor to shortstop the polymerization and to stabilized the polymer. After evaporating the hexanes, the resulting polymer was dried in a vacuum oven at 50° C. The coupled styrene-butadiene rubber (SBR) produced was determined to have a glass transition temperature (Tg) at −45° C. It was also determined to have a microstructure, which contained 49 percent 1,2-polybutadiene units, 37 percent 1,4-polybutadiene units and 14 percent random polystyrene units. The Mooney viscosity (ML-4) at 100° C. for this coupled polymer was also determined to be 114. The ML-4 for the base polymer (before coupling) was 25. Based on GPC measurement, the coupling efficiency was 83%.

COMPARATIVE EXAMPLE 2

The procedure described in Example 1 was utilized in this example except that 2.92 ml of 1M solution of n-butyllithium (in hexanes) was used as the polymerization initiator. The Tg and microstructure of the resulting coupled SBR are shown in Table 1. The Mooney viscosities of the base and coupled polymers are also shown in Table 1. The coupling efficiency was 55%, based on GPC measurement.

TABLE 1

| Exam- | Tg | ML-4 | | Microstructure (%) | | | Coupling |
|---|---|---|---|---|---|---|---|
| ple | (° C.) | Base | Coupled | 1,2-PBd | 1,4-PBd | Styrene | Efficiency |
| 1 | −44 | 25 | 114 | 49 | 37 | 14 | 83% |
| 2 | −45 | 25 | 85 | 49 | 37 | 14 | 55 |

EXAMPLE 3

The tin coupled SBR prepared in this experiment was synthesized in a three-reactor (1 gallon, 2 gallon, 2 gallon) continuous system at 80° C. A premix containing styrene and 1,3-butadiene in hexanes was charged into the first polymerization reactor continuously at a rate of 98 grams per minute. The premix monomer solution containing a ratio of styrene to 1,3-butadiene of 18:82 and had a total monomer concentration of 16%. Polymerization was initiated by adding 3-(t-butyl-dimethylsilyloxy)-1-propyl lithium (0.6 mmole/100 grams of monomer) and TMEDA (1 mmole/100 grams monomer) to the first reactor continuously. The resulting polymerization medium containing the live ends was continuously pushed to the second rector (for completing the polymerization) and then the third reactor where the coupling agent, tin tetrachloride, (0.15 mmole/100 grams monomer) was added continuously. The residence time for all reactors was set at one hour to achieve complete monomer conversion in the second reactor and complete coupling at the third reactor. The polymerization medium was continuously pushed over to a holding tank containing stabilizer and antioxidant. The resulting polymer cement was then steam stripped and the recovered SBR was dried in a vented oven at 50° C. The polymer was determined to have a glass transition temperature at −43° C. and have a Mooney ML-4 viscosity of 80. The Mooney viscosity of base (uncoupled precursor) was 32. It was also determined to have a microstructure, which contained 18% random polystyrene units, 41% 1,2-polybutadiene units, and 41% 1,4-polybutdiene units.

EXAMPLE 4

The produce described in Example 3 was utilized in this example except that n-butyllithium was used as the initiator. The Tg and microstructure of the resulting coupled SBR are shown in Table 2. The Mooney viscosities of the base and coupled polymers are also shown in Table 2.

TABLE 2

| | Tg | ML-4 | | Microstructure (%) | | |
|---|---|---|---|---|---|---|
| Example | (° C.) | Base | Coupled | 1,2-PBd | 1,4-PBd | Styrene |
| 3 | −43 | 32 | 80 | 41 | 41 | 18 |
| 4 | −42 | 42 | 68 | 42 | 41 | 17 |

EXAMPLE 5

In this example, a 50/50 isoprene-butadiene rubber (IBR) containing a silyloxyl functional group was prepared. In the procedure used, 2300 g of a silica/alumina/molecular sieve dried premix containing 19.0 weight percent isoprene/1,3-butadiene mixture in hexanes was charged into a one-gallon (3.8 liters) reactor. The ratio of styrene to 1,3-butadiene was 50:50. After the amount of impurity in the premix was determined, 1.7 ml of 1M solution of TMEDA (N,N,N',N'-tetramethylethylene-diamine in hexanes), and 2.5 ml. of 0.7M solution of 3-(t-butyldimethylsilyloxy)-1-propyllithium (in cyclohexane) were added to the reactor. The target Mn (number averaged molecular weight) was 250,000. The polymerization was allowed to proceed at 70° C. for 2.5 hours. The GC analysis of the residual monomers contained in the polymerization mixture indicated that most of the monomers were converted to polymer. At this time, the polymerization mixture was shortstopped with 2.0 ml. of 1M ethanol solution (in hexanes). The resulting polymer was stabilized with 1.0 phr (parts per 100 parts of rubber by weight) of BHT (2,6-di-tert-butyl-4-methylphenol). After evaporating the hexanes, the resulting polymer was dried in a vacuum oven at 50° C. The IBR produced was determined to have a glass transition temperature (Tg) at −45° C. It was also determined to have a microstructure, which contained 24 percent 1,2-polybutadiene units, 26 percent 1,4-polybutadiene units, 22 percent 1,4-polyisoprene units, 27 percent 3,4-polyisoprene units and 1% 1,2-polyisoprene unit. The Mooney viscosity (ML-4) at 100° C. for this polymer was also determined to be 65.

EXAMPLE 6

In this example, a telechelic 50/50 isoprene-butadiene rubber containing a silyloxyl functional group at the beginning of the polymer chain and an alkoxysilyl functional group at the end of polymer chain was prepared. The procedure described in Example 5 was used in this example except that 3-chloropropyltriethoxysilane was added to the polymerization mixture at the completion of polymerization (2.5 hours) to form an ethoxysilyl end functionalized IBR. The telichelic IBR produced was determined to have a glass transition temperature (Tg) at −44° C. It was also determined to have a microstructure which contained 25 percent 1,2-polybutadiene units, 25 percent 1,4 -polybutadiene units, 22 percent 1,4-polyisoprene units, 27 percent 3,4-polyisoprene units and 1% 1,2-polyisoprene unit. The Mooney viscosity (ML-4) at 100° C. for this polymer was also determined to be 69.

EXAMPLE 7

In this example, a telechelic 50/50 isoprene-butadiene rubber containing a silyloxy functional group at the beginning of the polymer chain and a alkoxysilyl sulfane functional group at the end of polymer chain was prepared. The procedure described in Example 5 was used in this example except that bis(3-triethoxysilylpropyl)disulfane was used in place of 3-chloropropyltriethoxy-silane to functionalize the polymer chain ends. The resulting telichelic IBR produced was determined to have a glass transition temperature (Tg) a −45° C. It was also determined to have a microstructure which contained 24 percent 1,2-polybutadiene units, 26 percent 1,4-polybutadiene units, 22 percent 1,4-polyisoprene units, 22 percent 3,4-polyisoprene units and 2% 1,2-polyisoprene unit. The Mooney viscosity (ML-4) at 100° C. for this polymer was also determined to be 72.

EXAMPLE 8

In this example, a 30/70 styrene-butadiene rubber (SBR) containing a silyloxy functional group was prepared. The procedure described in Example 5 was utilized in this example except that a mixture of styrene and 1,3-butadiene in hexanes was used as the monomers. The ratio of styrene to 1,3-butadiene was 30:70. The silyloxy functionalized SBR produced was determined to have a glass transition temperature (Tg) at −29° C. It was also determined to have a microstructure which contained 41 percent 1,2-polybutadiene units, 31 percent 1,4-polybutadiene units and 28 percent random polystyrene units. The Mooney viscosity (ML-4) at 100° C. for this polymer was also determined to be 70.

EXAMPLE 9

In this example, a telechelic 30/70 styrene-butadiene rubber containing a silyloxy functional group at the beginning of the polymer chain and an alkoxysilyl functional group at the end of polymer chain was prepared. The procedure described in Example 6 was utilized in this example except that a mixture of styrene and 1,3-butadiene in hexanes was used as the monomers. The ratio of styrene to 1,3-butadiene was 30:70. The telichelic SBR produced was determined to have a glass transition temperature (Tg) at −30° C. It was also determined to have a microstructure which contained 40 percent 1,2-polybutadiene units, 31 percent 1,4-polybutadiene units and 29 percent random polystyrene units. The Mooney viscosity (ML-4) at 100° C. for this polymer was also determined to be 73.

EXAMPLE 10

In this example, a telechelic 30/70 styrene-butadiene rubber containing a silyloxy functional group at the beginning of the polymer chain and a alkoxysilyl sulfane functional group at the end of polymer chain was prepared. The procedure described in Example 7 was utilized in this example except that a mixture of styrene and 1,3-butadiene in hexanes was used as the monomers. The ratio of styrene to 1,3-butadiene was 30:70. The telichelic SBR produced was determined to have a glass transition temperature (Tg) at −29° C. It was also determined to have a microstructure which contained 39 percent 1,2-polybutadiene units, 32 percent 1,4-polybutadiene units and 29 percent random polystyrene units. The Mooney viscosity (ML-4) at 100° C. for this polymer was also determined to be 89.

COMPARATIVE EXAMPLE 11

A 15/85 SBR was prepared, using a standard anionic polymerization technique, in a one gallon batch reactor with a TMEDA modified n-butyllithium (n-BuLi)catalyst at 70° C. The TMEDA/n-BuLi molar ratio was 0.85/1. It took 90 minutes to complete the polymerization. Tin tetrachloride in hexane (0.25/1 molar ratio to n-BuLi) was then added to the resulting polymer cement. The coupling reaction was carried out at a temperature of 70° C. for 30 minutes. The polymer was then stabilized with TMEDA/BHT. The coupling efficiency, the Tg, and the Mooney ML-4 viscosity of the polymer are listed in Table 3.

EXAMPLE 12

The procedure described in Example 11 was repeated in this example except that 3-(tributyltin)-1-propyllithium (Bu$_3$Sn(CH$_2$)$_3$Li), provided by Chemetall-Foote Co. was used as the initiator. The coupling efficiency, the glass transition temperature, and the Mooney ML-4 viscosity of the tin functionalized-coupled polymer are also listed in Table 3.

TABLE 3

| Example | Tg | Base ML-4 | Coupled ML-4 | % Coupling* |
|---------|------|-----------|--------------|-------------|
| 11 | 44° C. | 33 | 99 | 55 |
| 12 | 46° C. | 34 | 120 | 79 |

*Calculated from GPC data

While certain representative embodiments and details have been shown for the purpose of illustrating the subject invention, it will be apparent to those skilled in this art that various changes and modifications can be made therein without departing from the scope of the subject invention.

What is claimed is:

1. A process for synthesizing and coupling a rubbery polymer that comprises (1) polymerizing at least one conjugated diolefin monomer in the presence of a polar modifier to produce a living rubbery polymer, wherein said polymerization is an anionic polymerization that is initiated with 3-(-t-butyldimethylsilyloxy)-1-propyllithium; and (2) reacting the living rubbery polymer with both a tin halide and a silicon halide.

2. A process as specified in claim 1 wherein said process is conducted in the presence of a polar modifier.

3. A process as specified in claim 2 wherein said polar modifier is selected from the group consisting of diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, N-phenyl morpholine, and alkyltetrahydrofurfuryl ethers.

4. A process as specified in claim 1 wherein the conjugated diolefin monomer is 1,3-butadiene and wherein the rubbery polymer is polybutadiene rubber.

5. A process as specified in claim 1 wherein the tin halide is a tin tetrahalide and wherein the silicon halide is a silicon tetrahalide.

6. A process as specified in claim 1 wherein the tin halide is a tin trihalide and wherein the silicon halide is a silicon trihalide.

7. A process as specified in claim 5 wherein the tin tetrahalide is tin tetrachloride and wherein the silicon tetrahalide is silicon tetrachloride.

8. A process as specified in claim 1 which further comprises copolymerizing styrene monomer with the conjugated diolefin monomer, wherein the conjugated diolefin monomer is 1,3-butadiene and wherein the rubbery polymer is styrene-butadiene rubber.

9. A process as specified in claim 1 wherein the polar modifier is N,N,N',N'-tetramethylethylenediamine.

10. A process for synthesizing and coupling a rubbery polymer that comprises (1) polymerizing at least one conjugated diolefin monomer in the presence of a polar modifier to produce a living rubbery polymer, wherein said polymerization is an anionic polymerization that is initiated with an alkylsilyloxy protected functional lithium initiator having the structural formula:

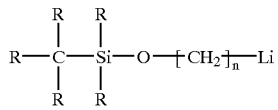

wherein n represents an integer from 1 to 10, wherein R represents alkyl groups that can be the same or different, and wherein the alkyl groups contain from 1 to about 8 carbon atoms; and (2) reacting the living rubbery polymer with both a tin halide and a silicon halide.

11. A process as specified in claim 10 wherein n represents an integer from 2 to 4, and wherein R represents an alkyl group containing from 1 to about 4 carbon atoms.

12. A process as specified in claim 10 wherein n represents 3 and wherein R represents methyl groups.

* * * * *